(12) United States Patent
Ito et al.

(10) Patent No.: US 7,380,874 B2
(45) Date of Patent: Jun. 3, 2008

(54) AUTOMOTIVE FLOOR PANEL ASSEMBLY

(75) Inventors: Hideaki Ito, Wako (JP); Yoshinori Taguchi, Wako (JP); Yasuyuki Shibata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 324 days.

(21) Appl. No.: 11/364,161

(22) Filed: Feb. 28, 2006

(65) Prior Publication Data
US 2006/0197361 A1 Sep. 7, 2006

(30) Foreign Application Priority Data
Mar. 2, 2005 (JP) ............................. 2005-057080
Mar. 2, 2005 (JP) ............................. 2005-057085

(51) Int. Cl.
*B62D 25/20* (2006.01)
(52) U.S. Cl. ..................... 296/193.07; 296/187.08; 296/30
(58) Field of Classification Search .......... 296/193.07, 296/30, 204, 187.08
See application file for complete search history.

(56) References Cited

U.S. PATENT DOCUMENTS 6,793,276 B2 * 9/2004 Sugihara et al. ............ 296/204

FOREIGN PATENT DOCUMENTS

JP 20021-302071 10/2002

* cited by examiner

*Primary Examiner*—Joseph D Pape
(74) *Attorney, Agent, or Firm*—Rankin, Hill & Clark LLP

(57) ABSTRACT

In an automotive floor panel assembly (1) comprising a floor panel (1M) stamp-formed of sheet metal and including a longitudinal floor tunnel (2) extending longitudinally in a laterally central part of the floor panel and a lateral floor tunnel (3) extending laterally across the longitudinal floor tunnel, a first reinforcement member (7), which may have a stepped cross section, attached to and extending along a front surface of a front wall (1fw) of the lateral floor tunnel so as to define a closed cross section jointly with the front wall of the lateral floor tunnel. Thereby, a closed cross section is defined jointly by the first reinforcement member and the front wall of the lateral floor tunnel immediately under the front end of the front seats (4) so that the floor panel can be favorably reinforced without limiting the leg rooms of the vehicle occupants of the front seats and without interfering with the space for receiving the fuel tank (10).

9 Claims, 4 Drawing Sheets

AUTOMOTIVE FLOOR PANEL ASSEMBLY

TECHNICAL FIELD

The present invention relates to an automotive floor panel assembly.

BACKGROUND OF THE INVENTION

In a moncoque automotive body structure, various body panel members are stamp formed of thin steel plate, and are joined by spot welding or the like so as to form the final body structure. In such a body structure, it is important to ensure an adequate rigidity to the floor panel assembly. For this purpose, it was previously proposed to provide a lateral floor tunnel that extends laterally across the floor panel under the front seats in addition to the more conventional longitudinal floor tunnel (see Japanese patent laid open publication No. 2002-302071. The resulting upward projection in the floor panel having a cross-shape is effective in increasing the rigidity of the floor panel.

However, when a heavy fuel tank is mounted in the recess defined by the lateral floor tunnel, an additional reinforcement is required, and there was some difficulty in preventing such an additional reinforcement from reducing the capacity of the fuel tank and/or the leg rooms of the vehicle occupants.

When a shift lever is mounted on the longitudinal floor tunnel, an added rigidity is required to ensure a favorable feel to the vehicle operator who operates the shift lever, and the cross-shaped floor tunnel was not found to be entirely satisfactory. Therefore, it is necessary to reinforce the part of the longitudinal floor tunnel around the shift lever for the purpose of ensuring the required rigidity. Welding a steel plate having a suitable thickness in a part of the longitudinal floor tunnel provides a required rigidity, but the need for such as added manufacturing step is not desirable from economic view points.

BRIEF SUMMARY OF THE INVENTION

In view of such problems of the prior art, a primary object of the present invention is to provide an automotive floor panel assembly having a longitudinal and lateral floor tunnel which can ensure an adequate rigidity to the floor panel assembly even when a fuel tank is mounted under the lateral floor tunnel.

A second object of the present invention is to provide an automotive floor panel assembly which can increase the rigidity of the floor panel assembly without reducing the leg rooms of the vehicle occupants.

A third object of the present invention is to provide an automotive floor panel assembly which can ensure an adequate rigidity to a part of a longitudinal floor tunnel where a shift lever is to be mounted without reducing the manufacturing efficiency or increasing the manufacturing cost.

At least some of these and other objects of the present invention can be accomplished by providing an automotive floor panel assembly, comprising: a floor panel stamp-formed of sheet metal and including a longitudinal floor tunnel extending longitudinally in a laterally central part of the floor panel and a lateral floor tunnel extending laterally across the longitudinal floor tunnel, the floor tunnels defining a cross shaped upward projection on an upper surface of the floor panel; and a first reinforcement member attached to and extending along a front surface of a front wall of the lateral floor tunnel so as to define a closed cross section jointly with the front wall of the lateral floor tunnel.

Thereby, a closed cross section is defined jointly by the first reinforcement member and the front wall of the lateral floor tunnel immediately under the front end of the front seats so that the floor panel can be favorably reinforced without limiting the leg rooms of the vehicle occupants of the front seats and without interfering with the space for receiving the fuel tank. For this purpose, the first reinforcement member may be provided with a stepped cross section.

At the intersection between the longitudinal and lateral floor tunnels, the first reinforcement member may include a central portion placed over an upper surface of the longitudinal floor tunnel. The central portion adds to the thickness of the wall of the corresponding part of the longitudinal floor tunnel. This is particularly advantageous when a support base for supporting a shift lever is attached to this part of the longitudinal floor tunnel. So as to minimize the number of points of spot welding and simplify the manufacturing process, the support base may be secured to the longitudinal floor tunnel jointly with the central portion of the first reinforcement member.

According to a preferred embodiment of the present invention, a second reinforcement member extends on the lower surface of the floor panel between two side walls of the longitudinal floor tunnel so that the tendency of the longitudinal floor tunnel to open can be favorably resisted. This can be particularly enhanced when the second reinforcement member extends substantially in alignment with the front wall of the lateral floor tunnel, and the second reinforcement member includes a pair of extensions extending laterally in either direction and joined to a lower surface of the floor panel opposite to a part of the first reinforcement member.

According to a particularly preferred embodiment of the present invention, the second reinforcement member comprises a pair of plate members extending between two side walls of the longitudinal floor tunnel and bent from a single plate member so as to connect the two plate members with a bottom flange. Therefore, when the first reinforcement member includes a central portion placed over an upper surface of the longitudinal floor tunnel, a substantially closed cross section is defined jointly with the second reinforcement member so that the rigidity at the intersection of the longitudinal and lateral floor tunnels can be particularly enhanced.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
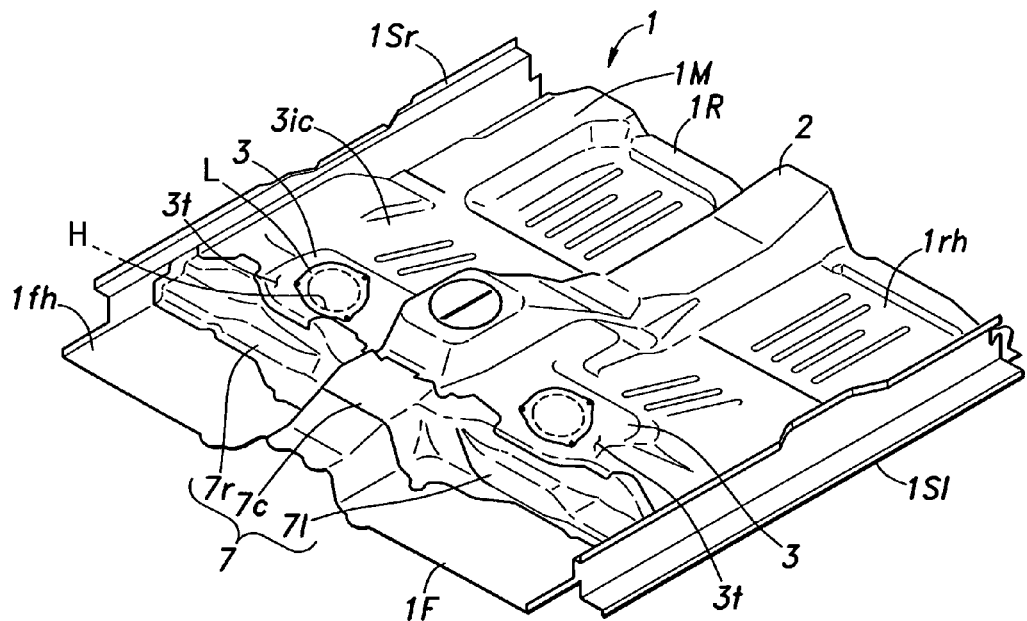
FIG. 1 is a perspective view of the upper surface of a floor panel assembly embodying the present invention.
Figure 2:
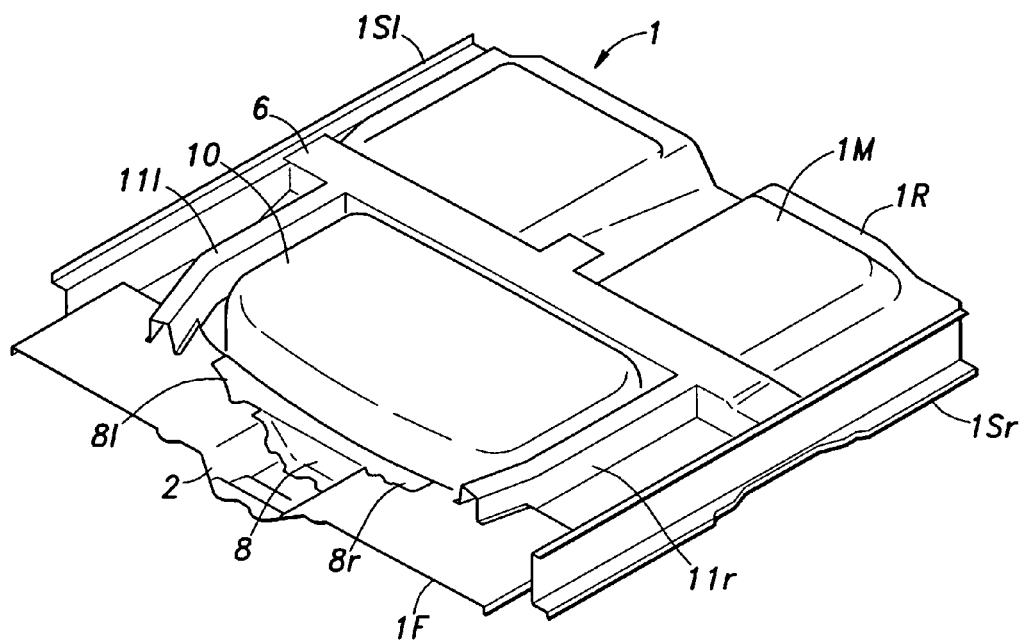
FIG. 2 is a perspective view of the bottom surface of the floor panel assembly shown in FIG. 1.

FIGS. 1 and 2 show a floor panel assembly embodying the present invention. This floor panel assembly 1 mainly consists of a floor panel 1M stamp-formed of substantially rectangular steel plate and has a substantially rectangular shape. The floor panel 1M is provided with a front edge 1F which is connected to a front dashboard (not shown in the drawings), a rear edge 1R which is connected to a mid cross member (not shown in the drawings) integrally formed with the floor of the trunk space, and a pair of lateral edges 1Sr and 1Sl which are joined to respective side sills (not shown in the drawings), and essentially defines the floor of the passenger compartment of an automobile. The floor panel assembly 1 is rectangular in shape as seen in plan view, and is given with an added rigidity by beads and recesses/projections formed therein.

A laterally central part of the floor panel 1M is formed with a longitudinal floor tunnel 2 extending in the longitudinal direction and having a trapezoidal cross section so as to increase the rigidity of the floor panel assembly 1 against bending in the longitudinal direction (or bending about a lateral line). A lateral floor tunnel 3 extends laterally across a front part of the longitudinal floor tunnel 2 so as to increase the rigidity of the floor panel assembly 1 against bending in the lateral direction (or bending about a longitudinal line). A pair of access holes H are formed in the top wall of the lateral floor tunnel 3 on either side of the longitudinal floor tunnel 2 to provide an access to a fuel tank 10 mounted under the lateral floor tunnel 3 as described hereinafter, and are normally closed by lids L by using threaded bolts.

Figure 3:
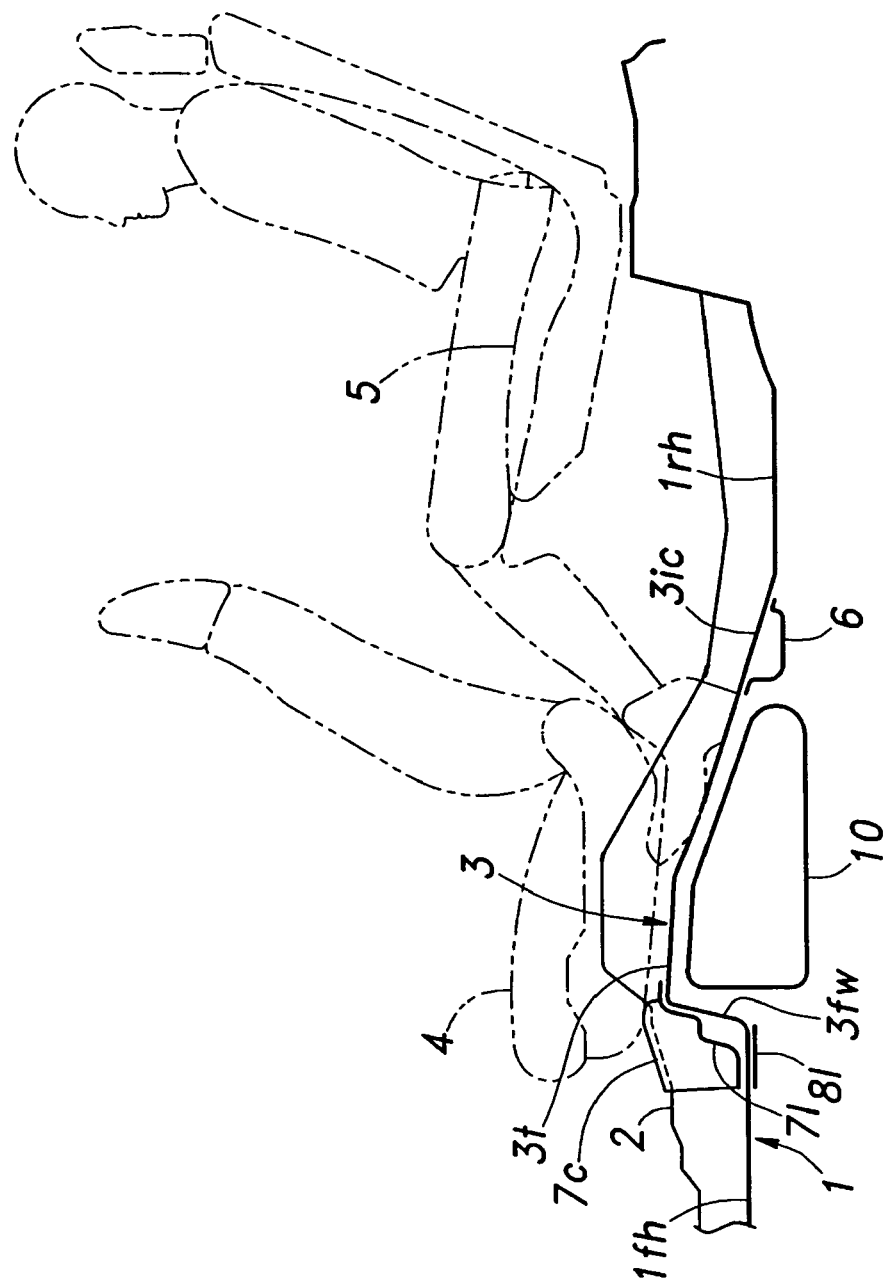
FIG. 3 is a schematic sectional side view of an automobile to which the present invention is applied taken along a plane passing through the left seats.
Figure 4:
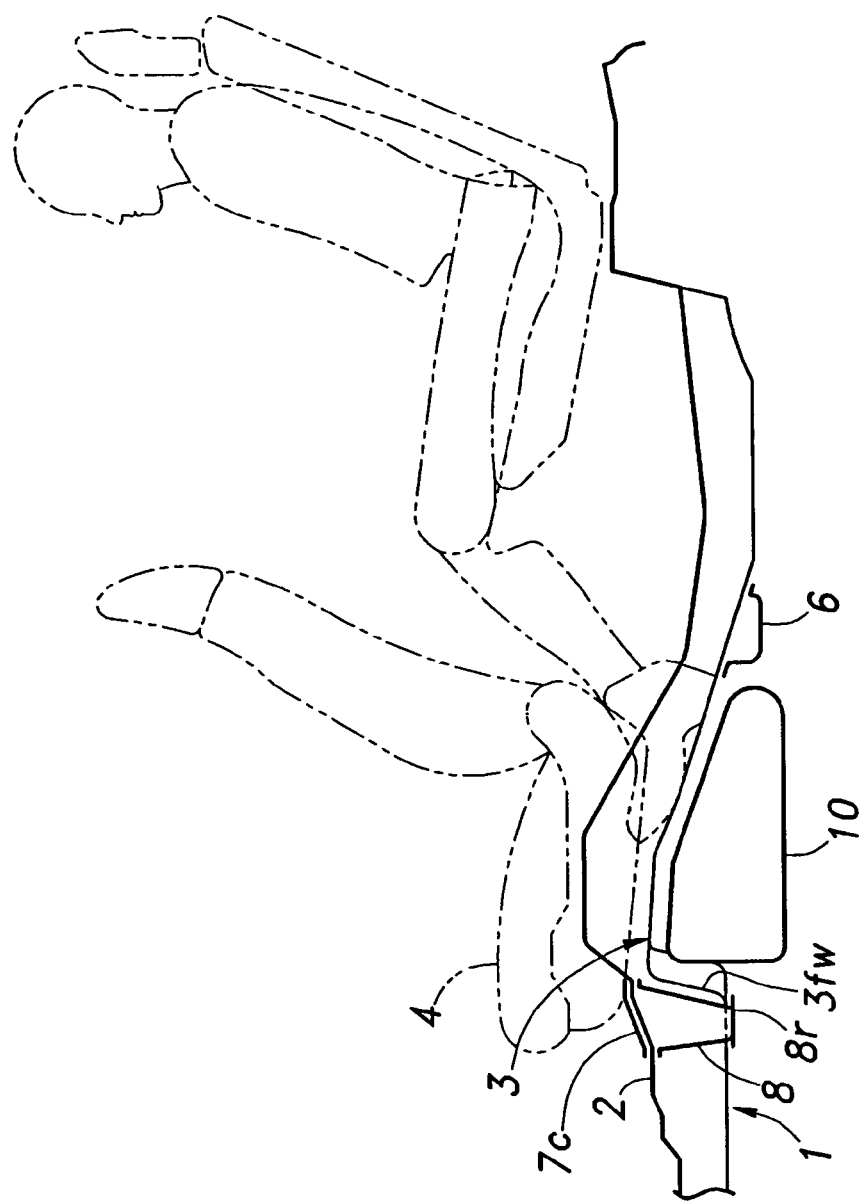
FIG. 4 is a view similar to FIG. 3 taken along a plane passing through the center of the automobile body.

As shown in FIG. 3 also, the lateral floor tunnel 3 comprises a front wall $3fw$ which is bent upright from a horizontal front portion $1fh$ of the floor panel 1M to define a part of the floor in front of the front seats 4, a top wall $3t$ extending substantially horizontally from the upper edge of the front wall $3fw$ and a rear slanted wall $3ic$ which is connected between the rear end of the top wall $3t$ of the lateral floor tunnel 3 and a horizontal rear portion $1rh$ of the floor panel 1M to define a part of the floor in front of the rear seats 5. A rear reinforcement cross member 6 having a channel cross section is attached to the lower surface of the rear end of the slanted wall $3ic$ so as to define a closed cross section by spot welding the flanges of the rear reinforcement cross member 6 to the lower surface of the floor panel 1M.

A first reinforcement member 7 extends along the front surface of the front wall $3fw$ of the lateral floor tunnel 3 substantially over the entire width of the floor panel 1M. The first reinforcement member 7 comprises a right and left portion $7r$ and $7l$ each having a stepped cross section and a central portion $7c$ which joins the right and left portions $7r$ and $7l$ with each other on the upper surface of the longitudinal floor tunnel 2, and is spot welded to the floor panel 1M at various points on the front wall $3fw$ and top wall $3t$ of the lateral floor tunnel 3. The spot welded points are denoted with letter X in FIG. 5. The two ends of the first reinforcement member 7 are connected to the lateral edges 1Sr and 1Sl of the floor panel 1M (and also to the side sills) so that a closed cross section is defined between the front wall $3fw$ of the lateral floor tunnel 3 and each of the right and left portions $7r$ and $7l$ of the first reinforcement member 7 over the entire width of the floor panel 1M as best shown in FIG. 3. The central portion $7c$ adds to the thickness of the longitudinal floor tunnel 2 at the intersection with the lateral floor tunnel 3. In particular, because the rigidity of the front wall $3fw$ of the lateral floor tunnel 3 is favorably increased, a reduction in the rigidity of the lateral floor tunnel 3 owing to the provision of the access holes H in the top wall $3t$ is more than made up for by the first reinforcement member 7.

The two parts of the front wall $3fw$ separated by the longitudinal floor tunnel 2 are connected with each other by a second reinforcement member 8 extending over the entire cross section of the longitudinal floor tunnel 2. In other words, the second reinforcement member 8 extends between the two side walls of the longitudinal floor tunnel 2. The second reinforcement member 8 further comprises a pair of extensions $8l$ and $8r$ extending in either lateral direction and joined to the lower surface of the floor panel 1M opposite to the corresponding portions of the first reinforcement member 7. The second reinforcement member 8 is spot welded to the lower surface of the floor panel and the inner wall of the longitudinal floor tunnel 2. The main part of the second reinforcement member 8 that extends inside the longitudinal floor tunnel 2 in fact consists of a pair of mutually spaced sections of steel plate that is bent from a single piece of steel plate and connected by a bottom flange. The extensions $8l$ and $8r$ of the second reinforcement member 8 extends from the part of the second reinforcement member 8 that joins the two sections inside the longitudinal floor tunnel 2. The main part of the second reinforcement member 8 resists the deformation of the two side walls of the longitudinal floor tunnel 2 away from each other, and the extensions $8l$ and $8r$ increase the thickness of the floor panel 1M and thereby firmly joins the two side sills to each other for an added rigidity of the floor panel 1M.

The recess defined by the lateral floor tunnel 3 on the lower side of the floor panel 1M is used for receiving the fuel tank 10. A pair of side reinforcement members $11l$ and $11r$ each having a channel cross section extend on either side of the fuel tank 10 between the rear reinforcement cross member 6 and the front wall $3fw$ of the lateral floor tunnel 3. The front end of each side reinforcement member $11l$ or $11r$ is also joined to the lower surface of the rear part of the horizontal front portion $1fh$. Thus, the fuel tank 10 is surrounded by the rear reinforcement cross member 6 extending along the rear end thereof, the side reinforcement members $11l$ and $11r$ extending along either lateral side thereof and the second reinforcement member 8 extending along the front end thereof.

Thereby, the parts of the floor panel assembly 1 supporting the fuel tank 10 and the front seats 4 are favorably reinforced without interfering with the space for mounting the fuel tank 10 and without limiting the leg rooms for the vehicle occupants seated in the front and rear seats. Also, the movement of the position of the front seats at the time of a vehicle crash can be minimized so that the benefits of a seat belt and an air bag can be fully gained. In other words, according to the illustrated embodiment, the rigidity of the floor panel assembly can be increased in an efficient manner, and the protection of the vehicle occupants from crash impacts can be enhanced.

Figure 5:
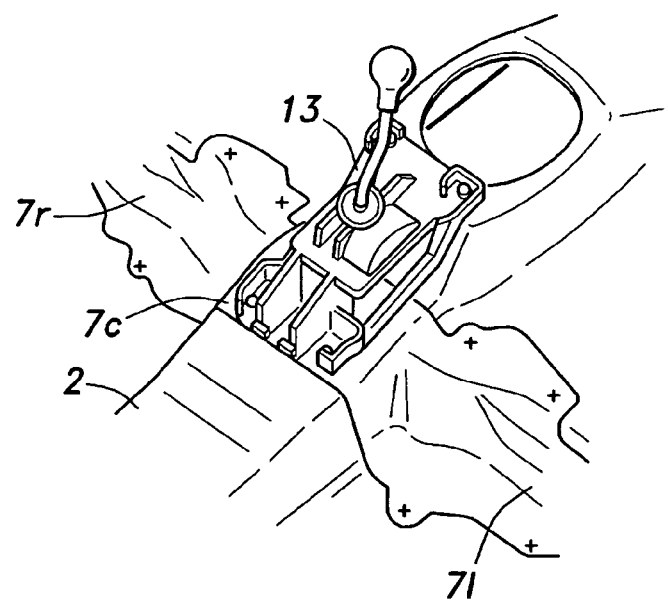
FIG. 5 is a fragmentary perspective view of a support base provided on the longitudinal floor tunnel for supporting a shift lever.
Figure 6:
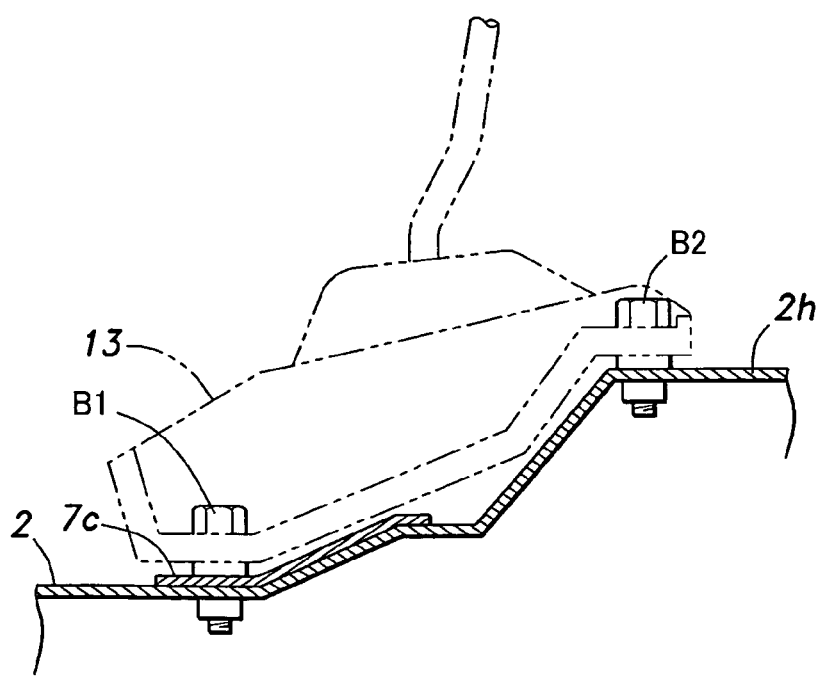
FIG. 6 is a fragmentary longitudinal sectional view of the support base for supporting a shift lever.

To the part of the longitudinal floor tunnel 2 interposed between the front seats 4 is attached a shift lever support base 13 made of die-cast aluminum alloy as shown in FIGS. 5 and 6. The front end of the support base 13 is secured to the longitudinal floor tunnel 2 jointly with the central portion $7c$ of the first reinforcement member 7 by using common threaded bolts B1 passed through the walls of the support base 13, the longitudinal floor tunnel 2 and the first reinforcement member 7. The rear end of the support base 13 is secured to a raised central portion $2h$ of the longitudinal floor tunnel 2 by using threaded bolts B2.

Because the central portion 7c of the first reinforcement member 7 is attached to the longitudinal floor tunnel 2 jointly with the support base 13 for supporting a shift lever, the first reinforcement member 7 can be secured to the longitudinal floor tunnel and increase the mounting rigidity of the support base 13 without increasing the number of points of spot welding.

Although the present invention has been described in terms of preferred embodiments thereof, it is obvious to a person skilled in the art that various alterations and modifications are possible without departing from the scope of the present invention which is set forth in the appended claims.

The contents of the original Japanese patent applications on which the Paris Convention priority claim is made for the present application are incorporated in this application by reference.

The invention claimed is:

1. An automotive floor panel assembly, comprising:
    a floor panel stamp-formed of sheet metal and including a longitudinal floor tunnel extending longitudinally in a laterally central part of the floor panel and a lateral floor tunnel extending laterally across the longitudinal floor tunnel, the floor tunnels defining a cross shaped upward projection on an upper surface of the floor panel; and
    a first reinforcement member attached to and extending along a front surface of a front wall of the lateral floor tunnel so as to define a closed cross section jointly with the front wall of the lateral floor tunnel.

2. An automotive floor panel assembly according to claim 1, further comprising a second reinforcement member extending on the lower surface of the floor panel between two side walls of the longitudinal floor tunnel.

3. An automotive floor panel assembly according to claim 2, wherein the second reinforcement member extends substantially in alignment with the front wall of the lateral floor tunnel.

4. An automotive floor panel assembly according to claim 3, wherein the second reinforcement member includes a pair of extensions extending laterally in either direction and joined to a lower surface of the floor panel opposite to a part of the first reinforcement member.

5. An automotive floor panel assembly according to claim 1, wherein the first reinforcement member is provided with a stepped cross section.

6. An automotive floor panel assembly according to claim 1, wherein the first reinforcement member includes a central portion placed over an upper surface of the longitudinal floor tunnel.

7. An automotive floor panel assembly according to claim 6, further comprising a support base for supporting a shift lever, the support base being secured to the longitudinal floor tunnel jointly with the central portion of the first reinforcement member.

8. An automotive floor panel assembly according to claim 2, wherein the second reinforcement member comprises a pair of plate members extending between two side walls of the longitudinal floor tunnel and bent from a single plate member so as to connect the two plate members with a bottom flange.

9. An automotive floor panel assembly according to claim 8, wherein the first reinforcement member includes a central portion placed over an upper surface of the longitudinal floor tunnel so as to define a substantially closed cross section jointly with the second reinforcement member.

* * * * *